W. C. MARSH.
VALVE.
APPLICATION FILED OCT. 9, 1916.

1,223,327.  Patented Apr. 17, 1917.

Inventor
William C. Marsh
by Percy B. Hills
Attorney

UNITED STATES PATENT OFFICE.

WILLIAM C. MARSH, OF ERIE, PENNSYLVANIA, ASSIGNOR TO MARSH VALVE COMPANY, OF ERIE, PENNSYLVANIA, A CORPORATION OF NEW YORK.

VALVE.

1,223,327.    Specification of Letters Patent.    Patented Apr. 17, 1917.

Continuation in part of application Serial No. 89,775, filed April 8, 1916. This application filed October 9, 1916. Serial No. 124,560.

*To all whom it may concern:*

Be it known that I, WILLIAM C. MARSH, a citizen of the United States, residing at Erie, in the county of Erie and State of Pennsylvania, have invented certain new and useful Improvements in Valves, of which the following is a specification.

My invention relates to valves, and has for its object to provide means for sealing the valve stem in all positions of the valve.

My invention is adapted particularly for use in connection with that type of valve now known as modulated valves, and the present case is in part a continuation of an application for Letters Patent filed by me April 8, 1916, Serial No. 89,775.

In the accompanying drawing:—

Similar numerals of reference denote corresponding parts in the several views.

Figure 1:
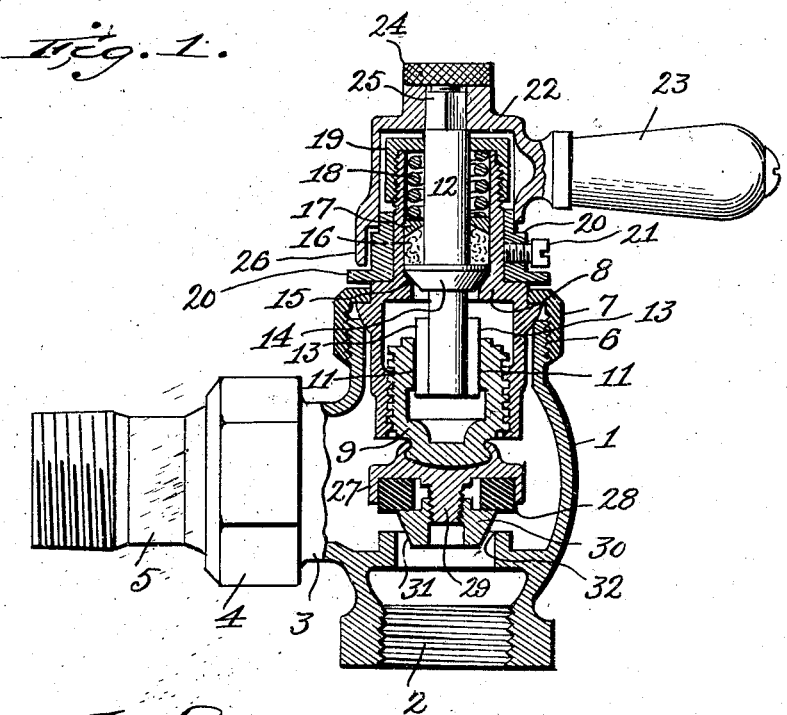
Figure 1 is a central vertical sectional view of a modulated valve embodying my improved construction.
Figure 2:
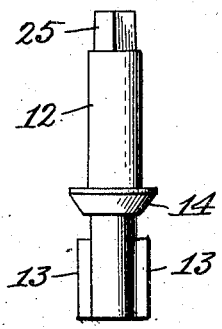
Fig. 2 is a detail elevation of the valve stem.
Figure 3:
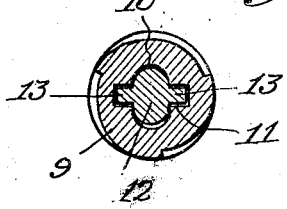
Fig. 3 is a detail horizontal sectional view of the valve stem and the valve carrier.

In the said drawing, the reference numeral 1 denotes the body of the valve, the same having the interiorly threaded inlet aperture 2 for the reception of the supply pipe, and the discharge 3, to which may be connected, by a union nut 4, a short threaded pipe section or nipple 5, for connection with the radiator. The upper side of the body 1 is apertured and exteriorly screw threaded at 6 to receive a union nut 7, engaging with a bonnet piece 8, which projects into the interior of the body 1, as shown, said body and bonnet piece forming the valve casing. This bonnet piece 8 is interiorly screw threaded at its lower end to receive the screw threaded exterior surface of a valve carrier 9, the latter adapted to be adjusted vertically in said bonnet piece. The upper end of said valve carrier is centrally apertured at 10 and is formed with diametrically opposed vertical slots 11 registering with said central aperture, said aperture and slots being adapted to receive the lower end of a valve stem 12, said lower end being provided with oppositely disposed fins 13, adapted to fit said aperture 10 and slots 11 in the valve carrier 9.

The valve stem 12 a little above the fins 13 is provided with a cone 14 adapted to seat upon a similar cone surface 15 in the bonnet piece, though said cones are of slightly unequal degrees, thereby giving a pointed bearing effecting a perfect seal between the two, as readily will be understood. Resting upon the upper flat surface of the cone 14 is a packing 16 upon which in turn rests a packing ring 17 and above said packing ring is disposed a comparatively heavy coiled spring 18, all for a purpose hereinafter to be described. The exterior surface of the bonnet piece surrounding said packing and spring is screw threaded to receive at its top a cap 19, against which the upper end of the spring 18 bears, and through which the tension of said spring may be applied. Below said cap 19 there is also fitted on the exterior of the bonnet piece 8 a flanged ring 20, adapted to rest on a flange formed on the bonnet piece 8 above the union nut 7, said ring being retained in fixed position by a screw 21 as shown. Said ring is formed on its upper horizontal annular face with marks to indicate the opening intermediate and closing positions of the valve, the screw 21 acting as a stop in the open direction of rotation. Fitted over the cap 19 and upper portion of the ring 20 is a cap piece 22 having attached thereto a handle 23 and being retained in place by means of a nut 24 engaging the upper end of the valve stem 12, said valve stem being formed angular at 25 to engage a similar angled aperture in said cap piece 22, whereby a rotation of said cap piece will be imparted to said valve stem. Formed integral with said cap piece on one side thereof is a pointer 26, which is adapted to indicate upon the ring 20 the position of the valve.

The valve carrier 9 at its lower end has swiveled thereon a valve piece 27, which is provided on its undersurface with an annular packing ring 28, and is formed with a central downward screw-threaded projection 29, adapted removably to receive a nut 30 provided with a lower coned surface 31, the same forming a closure member, adapted to fit snugly into the valve seat 32 when the valve is closed. In Fig. 1 the valve is shown in semi-open position, but when closed it is intended that the packing 28 shall rest and press upon the upper face of the valve seat 32, it being understood that the nut 30 when screwed to position upon the projection 29 operates to retain the annular packing 28 in position.

By employing the cone 14 on the valve stem 12, coöperating with the coned surface 15 in the bonnet piece 8, and by varying the relative pitch of said cone and cone seat slightly, as for instance, about one-fourth of a degree, I provide an annular bearing point which effects a perfect seal, this bearing being maintained by the pressure of the spring 18. But in the event of injury or wear to this seal, I provide the packing 16 on top thereof, which is also maintained in place by the spring 18, and acts automatically to reinforce the packless seal, which construction may properly be termed a reinforced packless seal. It will also be observed that the packing 16 in its stuffing box chamber instead of resting upon the bottom wall in said chamber rests upon the upper face of the coned portion of the valve stem 12, and in that way through the packing ring 17 and spring 18 will exert a direct downward pressure upon the valve stem, thereby tending to force the coned surface 14 thereon against its seat 15 in the bonnet piece 8 and also serving, should the contact between said cone and its seat be defective, to prevent leakage.

The valve handle 23 may be disposed in any desired position by closing the valve, then loosening the union nut 7, and turning the bonnet piece 8 and the parts carried thereby until the handle is in the desired position. The bonnet piece may then be locked in this position by screwing down the union nut 7, and the indicating ring 20 should be turned so that the closed position indicated thereon will register with the pointer 26, the same being locked in position through the screw 21.

Having thus described my invention, what I claim as new and desire to secure by Letters Patent, is:—

1. A valve, comprising a casing, a valve seat therein, a valve for said seat, a rotary valve stem for operating said valve, a packless seal in said casing for said valve stem, a packing in said casing reinforcing said packless seal, and resilient means for exerting pressure on said packing.

2. A valve, comprising a casing, a valve seat therein, a valve for said seat, a rotary valve stem for operating said valve, coöperating surfaces between said valve stem and casing forming a packless seal, a packing in said casing resting upon said packless seal, and resilient means for exerting pressure upon said packing.

3. A valve, comprising a casing, a valve seat therein, a valve for said seat, a rotary valve stem for operating said valve, complementary cones of unequal degrees in said casing and on said valve stem forming a packless seal, a packing in said casing resting upon an integral part of said valve stem and forming an auxiliary seal reinforcing said packless seal, and a spring for forcing said packing in sealing position and through said packing also maintaining said cones in sealing relation.

4. A valve, comprising a casing, a valve seat therein, a valve for said seat, a rotary valve stem for operating said valve, complementary cones of unequal degrees in said casing and on said valve stem forming a packless seal, a packing in said casing resting upon an integral part of said valve stem and forming an auxiliary seal reinforcing said packless seal, a spring exerting its tension on said packing, and a screw cap for retaining said spring in position.

In testimony whereof I hereunto set my hand this 2nd day of October, 1916.

WM. C. MARSH.